United States Patent
Silverman et al.

(10) Patent No.: US 9,521,520 B2
(45) Date of Patent: Dec. 13, 2016

(54) DISTRIBUTED-INPUT OFDM ANGLE-OF-ARRIVAL SCHEME FOR LOCATION DETERMINATION

(71) Applicant: Cisco Technology, Inc., San Jose, CA (US)

(72) Inventors: Matthew A. Silverman, Shaker Heights, OH (US); Paul J. Stager, Akron, OH (US)

(73) Assignee: Cisco Technology, Inc., San Jose, CA (US)

( * ) Notice: Subject to any disclaimer, the term of this patent is extended or adjusted under 35 U.S.C. 154(b) by 477 days.

(21) Appl. No.: 14/078,824

(22) Filed: Nov. 13, 2013

(65) Prior Publication Data

US 2015/0133172 A1     May 14, 2015

(51) Int. Cl.
*G01S 19/00* (2010.01)
*H04B 17/00* (2015.01)
*H04W 24/00* (2009.01)
*H04W 4/02* (2009.01)
*H04W 64/00* (2009.01)
(Continued)

(52) U.S. Cl.
CPC ............ *H04W 4/023* (2013.01); *G01S 5/0036* (2013.01); *G01S 13/878* (2013.01); *H04B 7/0404* (2013.01); *H04B 7/086* (2013.01); *H04W 24/00* (2013.01); *H04W 64/00* (2013.01)

(58) Field of Classification Search
CPC ............................ G01S 5/0036; G01S 13/878; G01S 2013/468; H04B 7/0404; H04B 7/086; H04W 24/00; H04W 64/00
See application file for complete search history.

(56) References Cited

U.S. PATENT DOCUMENTS 6,594,226 B1 * 7/2003 Benning ............... H04B 7/0613
                                                             342/354
7,200,392 B2 * 4/2007 Kennedy, Jr. ........... G01S 5/021
                                                             340/539.11
(Continued)

OTHER PUBLICATIONS

Balan, et al., "AirSync: Enabling Distributed Multiuser MIMO with Full Spatial Multiplexing," IEEE/ACM Transactions on Networking, Jul. 2012, pp. 1-15.

(Continued)

*Primary Examiner* — Alpus H Hsu
(74) *Attorney, Agent, or Firm* — Edell, Shapiro & Finnan, LLC

(57) ABSTRACT

A particular first wireless device having a plurality of antennas and that is part of a group of a plurality of first wireless devices, transmits to a second wireless device (whose location is to be determined) a packet across the plurality of antennas of the particular first wireless device simultaneously with a plurality of packets transmitted by a corresponding one of other first wireless devices in the group. The packet transmitted by the particular first wireless device uses a subset of a set of subcarriers available for use in the packet such that substantially the entire set of subcarriers are used in the aggregate across the plurality of packets simultaneously transmitted by the plurality of first wireless devices in the group to the second wireless device. The simultaneous reception of the plurality of packets at the second wireless device enables the second wireless device to determine its location.

20 Claims, 9 Drawing Sheets

(51) Int. Cl.
*H04B 7/08* (2006.01)
*G01S 5/00* (2006.01)
*G01S 13/87* (2006.01)
*H04B 7/04* (2006.01)

(56) References Cited

U.S. PATENT DOCUMENTS

| | | | | |
|---|---|---|---|---|
| 7,274,677 | B1* | 9/2007 | Lewis | H04B 7/0617 370/310.2 |
| 8,050,288 | B2* | 11/2011 | Kapoor | H01Q 1/246 370/252 |
| 8,207,892 | B2 | 6/2012 | Abbasfar | |
| 8,233,554 | B2 | 7/2012 | Karabinis | |
| 8,233,920 | B2 | 7/2012 | Gerstenberger et al. | |
| 8,254,847 | B2 | 8/2012 | Sen | |
| 8,503,283 | B2* | 8/2013 | Kafle | H04L 5/0007 370/203 |
| 8,526,391 | B2 | 9/2013 | Issakov et al. | |
| 8,537,916 | B2 | 9/2013 | Karabinis | |
| 8,723,729 | B2* | 5/2014 | Desai | G01S 3/50 342/433 |
| 8,767,691 | B2* | 7/2014 | Li | H04W 72/046 370/338 |
| 8,768,344 | B2* | 7/2014 | Naguib | G01S 5/021 455/423 |
| 8,831,594 | B2* | 9/2014 | Naguib | G01S 5/021 455/423 |
| 8,924,155 | B2* | 12/2014 | Waters | G01S 5/0242 342/451 |
| 9,002,349 | B2* | 4/2015 | Naguib | G01S 5/021 455/424 |
| 9,332,523 | B2* | 5/2016 | Zhang | H04W 64/003 |
| 2008/0080631 | A1 | 4/2008 | Forenza et al. | |
| 2008/0118004 | A1 | 5/2008 | Forenza et al. | |
| 2008/0130790 | A1 | 6/2008 | Forenza et al. | |
| 2009/0034640 | A1* | 2/2009 | Sondur | H04B 7/0617 375/260 |
| 2009/0067402 | A1 | 3/2009 | Forenza et al. | |
| 2009/0110087 | A1* | 4/2009 | Liu | H04L 1/0021 375/260 |
| 2010/0130230 | A1 | 5/2010 | Aggarwal | G01S 5/0263 455/456.1 |
| 2010/0172309 | A1 | 7/2010 | Forenza et al. | |
| 2010/0316163 | A1 | 12/2010 | Forenza et al. | |
| 2011/0002371 | A1 | 1/2011 | Forenza et al. | |
| 2011/0002410 | A1 | 1/2011 | Forenza et al. | |
| 2011/0002411 | A1 | 1/2011 | Forenza et al. | |
| 2011/0003606 | A1 | 1/2011 | Forenza et al. | |
| 2011/0003607 | A1 | 1/2011 | Forenza et al. | |
| 2011/0003608 | A1 | 1/2011 | Forenza et al. | |
| 2011/0044193 | A1 | 2/2011 | Forenza et al. | |
| 2012/0087430 | A1 | 4/2012 | Forenza et al. | |
| 2012/0093078 | A1 | 4/2012 | Perlman et al. | |
| 2012/0214512 | A1* | 8/2012 | Siomina | G01S 5/0205 455/456.2 |
| 2012/0256726 | A1* | 10/2012 | Honkanen | G01S 3/48 340/10.1 |
| 2012/0257508 | A1* | 10/2012 | Reunamaki | H04W 8/005 370/241 |
| 2012/0314570 | A1 | 12/2012 | Forenza et al. | |
| 2013/0034130 | A1 | 2/2013 | Forenza et al. | |
| 2013/0039168 | A1 | 2/2013 | Forenza et al. | |
| 2013/0088395 | A1* | 4/2013 | Vaarakangas | G01S 3/48 342/378 |
| 2013/0321209 | A1* | 12/2013 | Kalliola | G01S 5/02 342/419 |
| 2014/0092877 | A1* | 4/2014 | Kazmi | H04W 88/06 370/336 |
| 2014/0162686 | A1* | 6/2014 | Lee | H04W 64/003 455/456.1 |
| 2014/0269389 | A1* | 9/2014 | Bukkfejes | G01S 3/48 370/252 |
| 2014/0327579 | A1* | 11/2014 | Hart | H04W 64/006 342/374 |
| 2014/0375505 | A1* | 12/2014 | Anderson | G01S 5/0215 342/464 |
| 2015/0011236 | A1* | 1/2015 | Kazmi | H04W 52/365 455/456.1 |
| 2015/0208198 | A1* | 7/2015 | Duan | H04W 64/00 455/456.2 |
| 2015/0234033 | A1* | 8/2015 | Jamieson | G01S 5/04 455/456.1 |
| 2016/0033616 | A1* | 2/2016 | Sen | H04W 64/00 455/456.5 |
| 2016/0071409 | A1* | 3/2016 | Suomela | H04R 1/1041 340/12.5 |

OTHER PUBLICATIONS

Balan, et al., "Distributed Multiuser MIMO with Full Spatial Multiplexing," Ming Hsieh Institute, Mar. 12, 2012, pp. 1-2.

Murakami, et al., "Performance Evaluation of Distributed Multi-cell Beamforming for MU-MIMO Systems," 8th International Symposium on Wireless Communication Systems, 2011, pp. 547-551.

* cited by examiner

DISTRIBUTED-INPUT OFDM ANGLE-OF-ARRIVAL SCHEME FOR LOCATION DETERMINATION

TECHNICAL FIELD

The present disclosure relates to wireless communication networks.

BACKGROUND

Angle-of-Arrival (AoA) has become an important technology in location determination schemes, particularly in Wi-Fi™ wireless local area networks, due to the accuracy/resolution of AoA techniques. This is the case even within narrower radio frequency channel bandwidths, e.g., 20 MHz channels. Efforts have been made in the industry to have cooperation between access points (APs) and clients to facilitate location determination of clients. These efforts have primarily focused around the client listening for packets from APs to determine its own location.

DESCRIPTION OF EXAMPLE EMBODIMENTS

Overview

Techniques are presented herein to facilitate location determination for a wireless device operating in an environment where it can receive signals from a plurality of other wireless devices at known locations. A particular first wireless device having a plurality of antennas and that is part of a group of a plurality of first wireless devices, transmits to a second wireless device (whose location is to be determined) a packet across the plurality of antennas of the particular first wireless device simultaneously with a plurality of packets transmitted by a corresponding one of other first wireless devices in the group. The packet transmitted by the particular first wireless device uses a subset of a set of subcarriers available for use in the packet such that substantially the entire set of subcarriers is used in the aggregate (or collective) across the plurality of packets simultaneously transmitted by the plurality of first wireless devices in the group to the second wireless device. The simultaneous reception of the plurality of packets at the second wireless device enables the second wireless device to perform angle-of-arrival location determination with respect to the plurality of first wireless devices in the group.

Example Embodiments

Presented herein are techniques to facilitate angle-of-arrival analysis of signals transmitted by a plurality of first wireless devices and received at a second wireless device to enable the second wireless device to compute its location with respect to known locations of the plurality of first wireless devices. The following description is made with respect to a Wi-Fi™ wireless local area network in which the first wireless devices are access points (APs) and the second wireless device is a client or station (non-AP), but that is only by way of example. These techniques are applicable to other wireless networks and communication systems in which, in general, there are a plurality of first wireless devices at known locations and a second wireless device whose location is to be determined or confirmed based on signals received from the plurality of first wireless devices.

Figure 1:
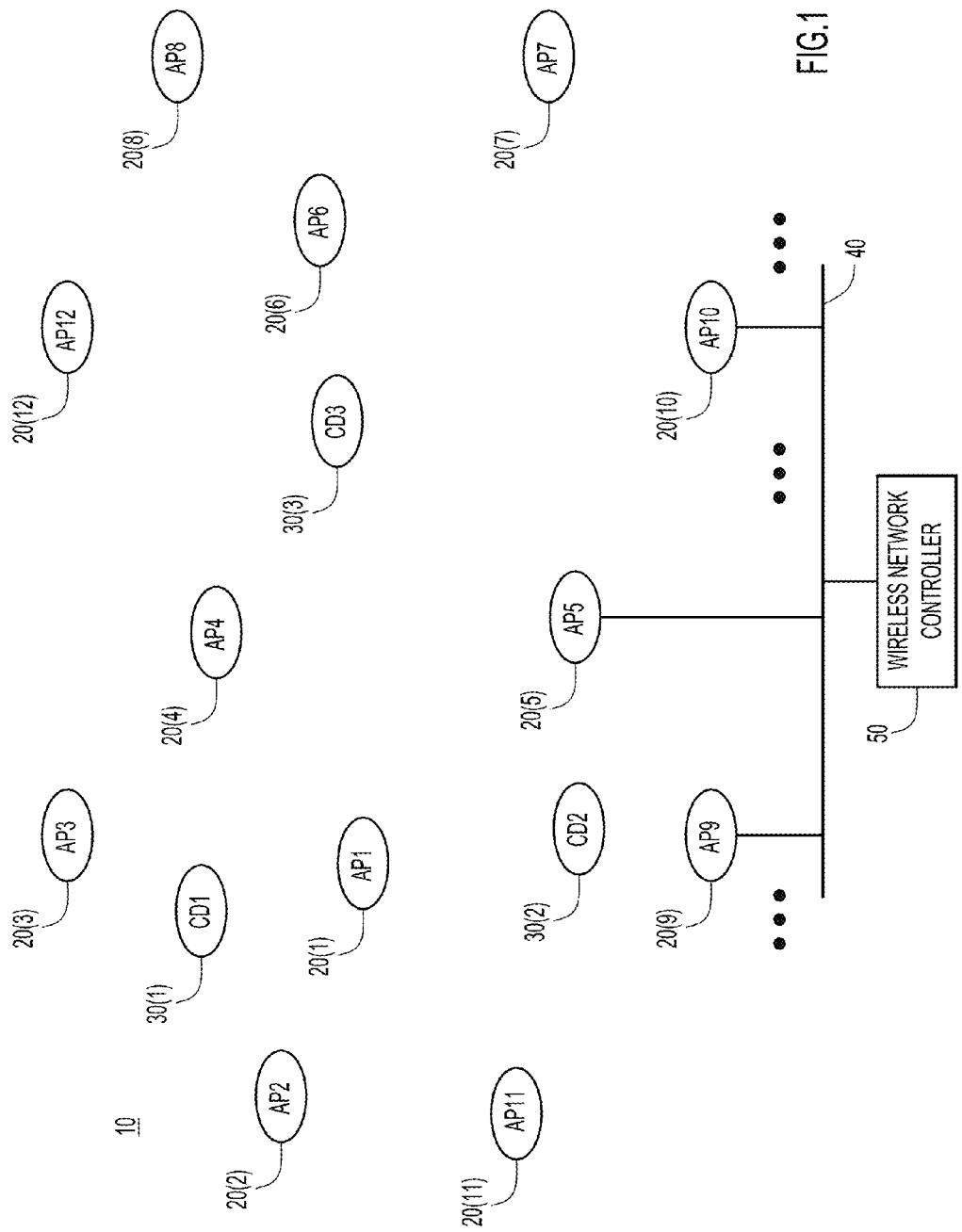
FIG. 1 is a diagram illustrating an example deployment of access points and clients in a wireless local area network configured to support the distributed-input angle-of-arrival location techniques presented herein.

Referring first to FIG. 1, a block diagram is shown of an example wireless network 10 comprising a plurality of wireless access points (APs) 20(1)-20(12) (also labeled AP1-AP12) and wireless client devices (CDs) 30(1)-30(3) (also labeled CD1-CD3). FIG. 1 is a simplified diagram of a wireless network and it is to be understood that a typical wireless network deployment may have numerous more (or perhaps less) APs and CDs. Each of the APs 20(1)-20(12) is connected by way of a wired network 40, e.g., local area network, to a wireless network controller 50. It should be understood that the APs 20(1)-20(12) may be connected by a wireless connection to the wireless network controller 50. The wireless network controller 50 may be located in a building in which the APs 20(1)-20(12) are located, or remote from the APs, in which case it is understood that the network 40 is connected to a wide area network to enable connectivity of the APs 20(1)-20(12) to the wireless network controller 50. The wireless network controller 50 may be a physical device, e.g., a server blade with network connectivity, or a software application hosted in a cloud computing/data center facility.

In general, the APs 20(1)-20(12) are at known locations within, near or in proximity of one or more buildings. The locations of the APs 20(1)-20(12) may be determined a priori through any techniques, as well as with the techniques presented herein. Transmissions sent from a plurality of first devices (APs) at known locations to a second device (a client) whose location is to be determined allows the second device to determine its location.

Figure 2:
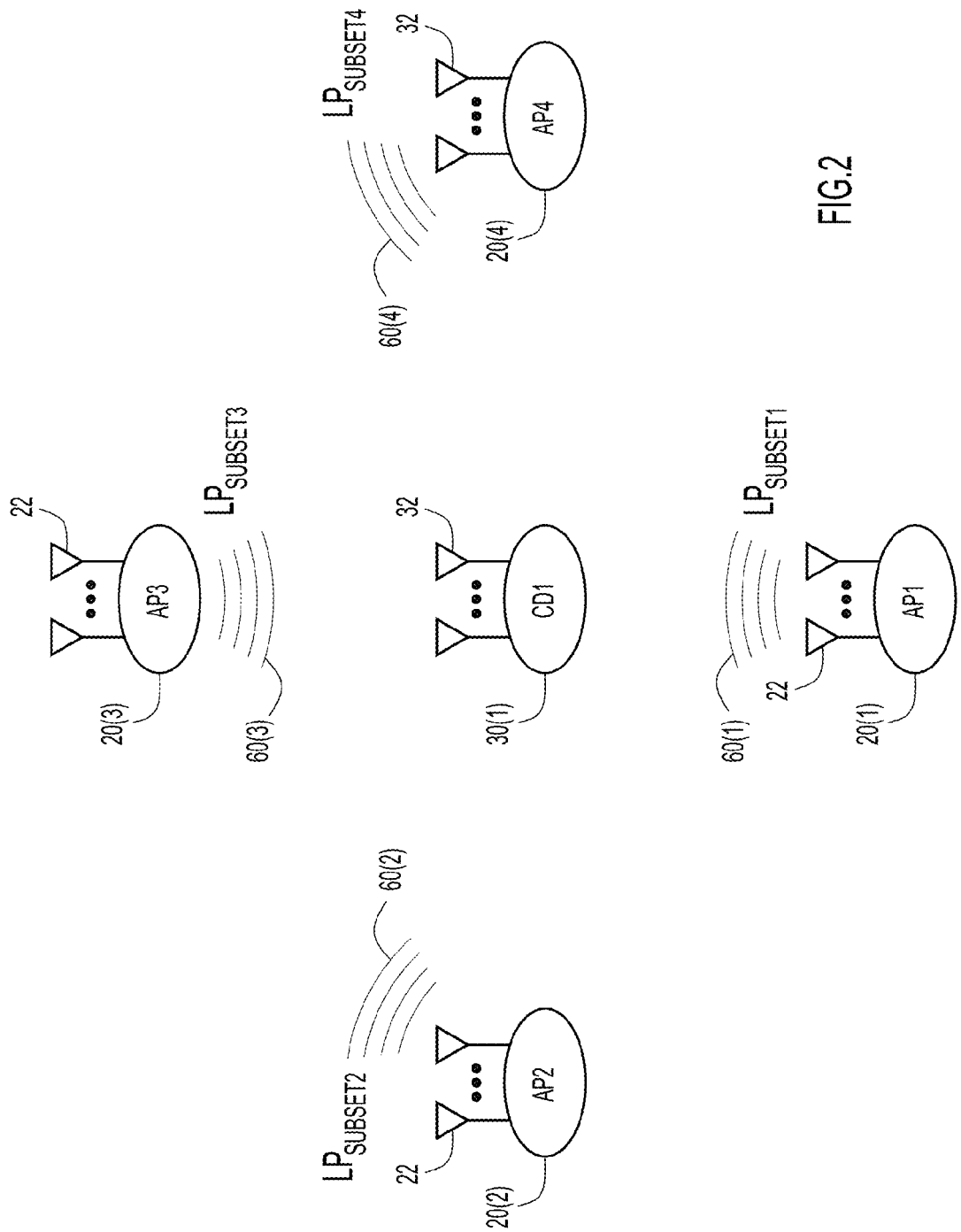
FIG. 2 is a diagram depicting transmissions from multiple access points in the angle-of-arrival location techniques presented herein.

Conventional angle-of-arrival (AoA) techniques used in wireless networks, such as IEEE 802.11 (Wi-Fi™) networks, require separate complete packets to be transmitted (at different time intervals) from each AP to the client device. However, if a plurality of APs are time-synchronized to each other, multiple packet exchanges can be reduced to a single packet, where each AP simultaneously transmits a subset of the subcarriers of the full/complete packet. To this end, reference is now made to FIG. 2. FIG. 2 shows a group of APs 20(1)-20(4) and CD 30(1). Each of the APs has a plurality of antennas, collectively identified by reference numeral 22. The CD 30(1) has one or more antennas collectively identified by reference numeral 32. In this example, CD 30(1) is associated to AP 20(2) and CD 30(1) is the wireless device whose location is to be determined.

Instead of each AP 20(1)-20(4) separately sending a location packet (LP) (at different times), each location packet with an entire/full set of subcarriers, each of the APs 20(1)-20(4) simultaneously transmits a location packet with a subset of the full set of subcarriers that would otherwise be used in a location packet. This is depicted in FIG. 2, where AP 20(1) transmits a location packet using a first subset of subcarriers, denoted $LP_{Subset1}$ and shown at reference numeral 60(1), AP 20(2) transmits a location packet using a second subset of subcarriers, denoted $LP_{Subset2}$ and shown at reference numeral 60(2), AP 20(3) transmits a location packet using a third subset of subcarriers and shown at reference numeral 60(3), denoted $LP_{Subset3}$, and AP 20(4) transmits a location packet using a fourth subset of subcarriers, denoted $LP_{Subset4}$ and shown at reference numeral 60(4). Thus, each subset of subcarriers used for transmission by each AP is unique. The location packet is a transmission of values at subcarriers to enable the client device to perform angle-of-arrival analysis on the receive transmission. For example, the location packet may be an OFDM packet using an 802.11a/g/n or 802.11ac preamble in which the actual payload data is unnecessary or irrelevant. The location packet could be a null data packet (NDP) that is used in explicit sounding procedures.

Figure 3:
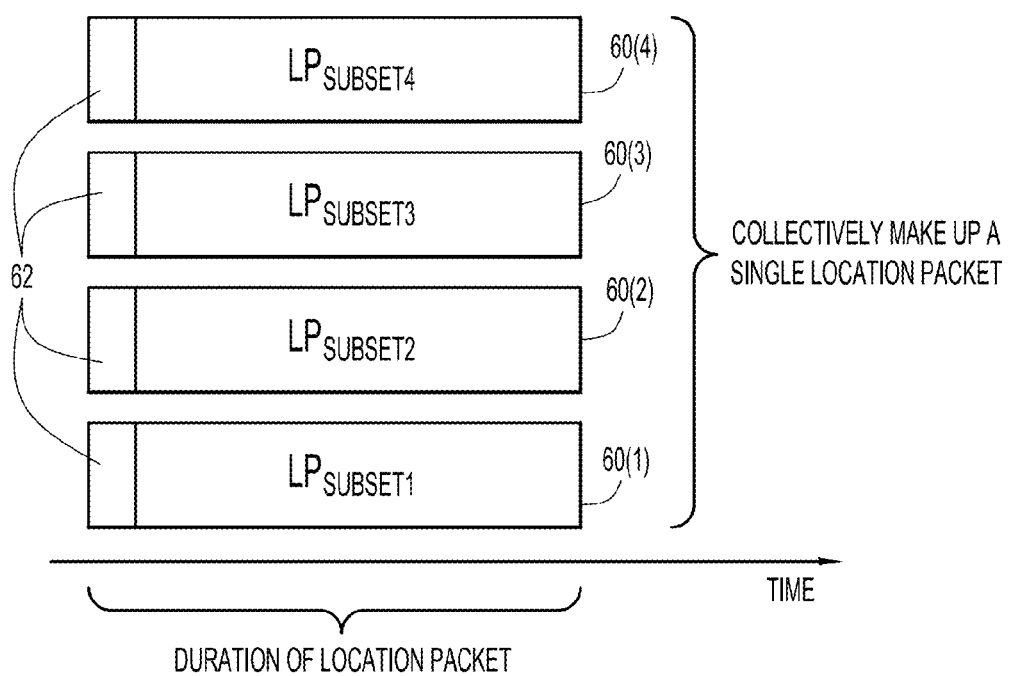
FIG. 3 is a diagram showing an example of the simultaneous transmissions made from multiple access points in connection with the angle-of-arrival location techniques presented herein.

FIG. 3 illustrates the time-overlapping nature of the location packets 60(1)-60(4) simultaneously transmitted by the APs 20(1)-20(4). As indicated in FIG. 3, the location packets 60(1)-60(4) are sent simultaneously by the APs 20(1)-20(4), and collectively make up (in terms of subcarriers) a single location packet (that would otherwise be separately and sequentially transmitted by each of the APs 20(1)-20(4)).

The client device(s) whose location is to be determined either knows the AP/subcarrier mapping beforehand (as described further hereinafter) or it is provided with the AP/subcarrier mapping in the location packet itself. The client device is also provided with the location of each AP. For example, as shown in FIG. 3, a portion shown at reference numeral 62 of each packet 60(1)-60(4) is allocated to contain information indicating the subcarriers used for that packet, the location of the AP which transmits that packet and an AoA group identifier (described below). When the client device receives the location packets from the APs, the client device can calculate the AoA from each AP. From the AoA information for each AP, the client device can ultimately compute its most likely physical location.

Subcarrier Mapping

Each AP is designated/assigned a set of subcarriers (that is, a subset of the overall set of subcarriers otherwise available) to transmit on. The mapping can be intelligently constructed based on channel state information obtained for the wireless channel between an AP and the client device whose location is to be determined, or arbitrarily constructed. The subcarriers within a subset for each AP can be contiguous or staggered. In the case of intelligently constructing the subcarrier mapping, the AP can use uplink packet sounding to identify any nulls or channel discontinuities that a particular AP needs to avoid in mapping, which would be reported back to a central server, e.g., the wireless network controller 50 (FIG. 1) or some other computing entity. Each AP may transmit the subset of subcarriers that it is assigned across all or select one or more of its antennas.

So that the client device can resolve the phase of the signal from each individual transmitter of each AP, APs may map specific transmitters to some of its designated subcarriers. Alternatively, the same channel estimation that is used in explicit sounding can be used, where multiple spatial streams are sent, and each spatial stream resolves a single antenna of the transmitting AP. A combination of the two techniques could be used as well. In the case where individual transmitters are mapped to different subcarriers, a minimum of nTx subcarriers is required. In the case where explicit sounding is used, the number of subcarriers that each AP requires in order to fully sound the transmit chains depends on the number of transmit chains of the AP (nTx), and the maximum number of spatial streams a client device can sound (nSSmax), ceil(nTx/nSSmax). Any additional subcarriers that are mapped to that AP are redundant and would be used in averaging.

Figure 4:
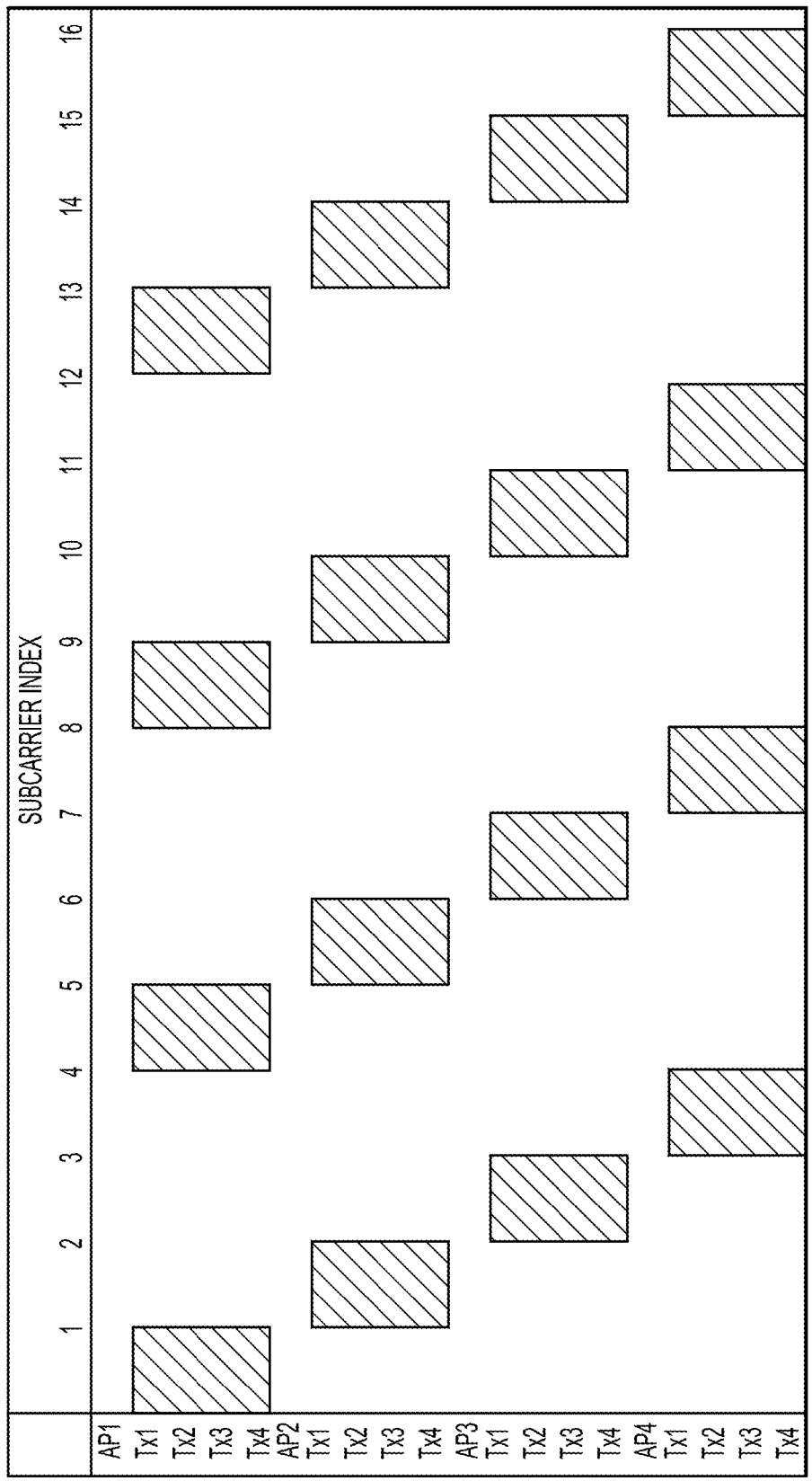
FIG. 4 is a diagram showing a first example of an assignment of OFDM subcarriers to transmissions made by access points as part of the angle-of-arrival location techniques.
Figure 5:
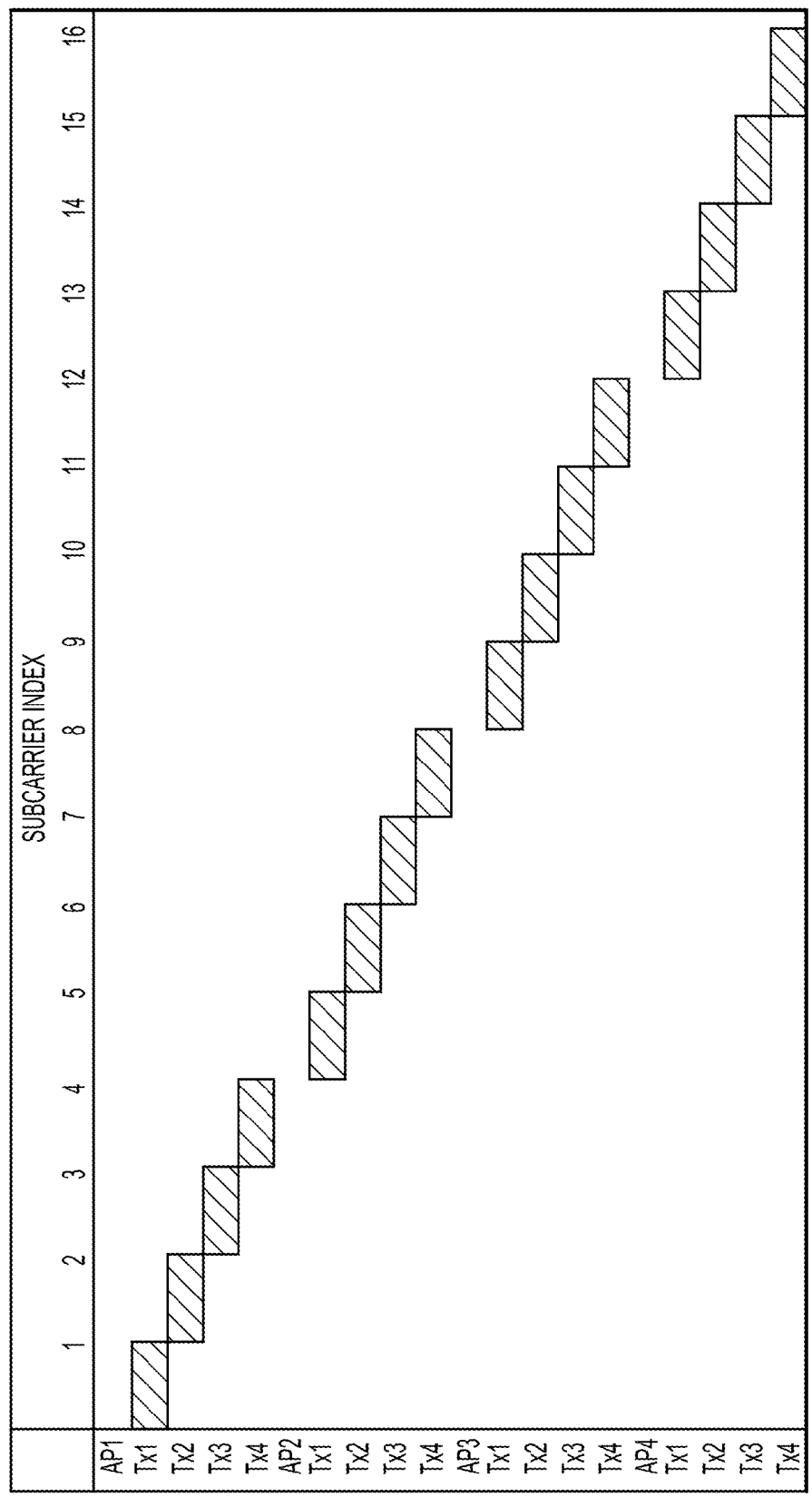
FIG. 5 is a diagram showing a second example of an assignment of OFDM subcarriers to transmissions made by access points as part of the angle-of-arrival location techniques.

FIGS. 4 and 5 illustrate examples of subcarrier mappings among the location packets transmitted by a group of APs to a client device. Specifically, FIG. 4 shows a subcarrier assignment scheme that is useful when the APs can perform explicit sounding of the wireless channel to a client device. In the example of FIG. 4, there are 16 subcarriers in a complete set of subcarriers. Each AP uses a subset of these subcarriers. For example, AP1 transmits on subcarriers 1, 5, 9 and 13 (across all of its antennas/transmitters, e.g., 4 antennas/transmitters denoted Tx1, Tx2, Tx3 and Tx4); AP2 transmits on subcarriers 2, 6, 10 and 14 across all of its antennas/transmitters; AP3 transmits on subcarriers 3, 7, 11 and 15 across all of its antennas/transmitters and AP4 transmits on subcarriers 4, 8, 12 and 16 across all of its antennas/transmitters. Thus, $LP_{Subset1}$ transmitted by AP1 uses subcarriers 1, 5, 9 and 13, $LP_{Subset2}$ uses subcarriers 2, 6, 10 and 14, $LP_{Subset3}$ transmitted by AP3 uses subcarriers 3, 7, 11 and 15, and $LP_{Subset4}$ transmitted by AP4 uses subcarriers 4, 8, 12 and 16.

FIG. 5 illustrates a subcarrier mapping that is particularly useful when the APs cannot perform explicit sounding with respect to the client device. In this mapping scheme, each antenna/transmitter of each AP transmits on a different subcarrier. That is, AP1 transmits from antenna/transmitter 1 on subcarrier 1, from antenna/transmitter 2 on subcarrier 2, from antenna/transmitter 3 on subcarrier 3 and from antenna/transmitter 4 on subcarrier 4. Similarly, AP2 transmits from antenna/transmitter 1 on subcarrier 5, from antenna/transmitter 2 on subcarrier 6, from antenna/transmitter 3 on subcarrier 7 and from antenna/transmitter 4 on subcarrier 8. AP3 transmits from antenna/transmitter 1 on subcarrier 9, from antenna/transmitter 2 on subcarrier 10, from antenna/transmitter 3 on subcarrier 11 and from antenna/transmitter 4 on subcarrier 12. AP4 transmits from antenna/transmitter 1 on subcarrier 13, from antenna/transmitter 2 on subcarrier 14, from antenna/transmitter 3 on subcarrier 15 and from antenna/transmitter 4 on subcarrier 16.

Thus, FIGS. 4 and 5 represent a scheme in which a plurality of APs simultaneously transmit a packet to the CD, such that the packet transmitted by each AP uses a subset of a set of subcarriers otherwise available for use in the packet such that substantially the entire set of subcarriers are used in the aggregate (collective) across the plurality of packets simultaneously transmitted by the APs to the CD. This enables the CD to perform AoA location determination with respect to the plurality of APs. In general, the subsets of subcarriers assigned to and used by each of the APs are mutually exclusive from each other. There may be situations where a few subcarriers between two or more APs overlap, and that would be at the expense of a less reliable location estimate for the CD and the CD could ignore those overlapping subcarriers in the AoA location estimation. Nevertheless, the aggregate of the subcarriers simultaneously transmitted on across the plurality of APs forms a single packet, for purposes of this disclosure.

Packet Generation

As explained above, the location packets are sent across a distributed network of synchronized access points/transmitters. The access points/transmitters would need to be synchronized over relatively short periods of time immediately before and during the distributed transmissions. For example, synchronization frames could be sent by the access points/transmitters immediately before the distributed transmissions to enable the access points to synchronize before the distributed location packet transmissions. In this way, the synchronization need not be persistent. Several APs would be identified as an AoA AP group in a coordinated location packet transmission event. The same AP can appear in multiple groups. For each group, a packet is centrally constructed (at a particular AP, at the wireless network controller or at some other computing entity) to include the relevant data about the group (AP/subcarrier mapping, AP transmitter location, AoA group ID, etc.).

As an alternative, the information about the respective location packets can be held at each AP, and a wireless protocol between the APs can be used to trigger a transmission. When the transmission occurs, each AP only transmits on the subcarriers that it was designated to use. Highly synchronized clocks of the APs allow for a packet to be transmitted across all APs in the group at effectively the same time, i.e., substantially simultaneously.

The client device could also initiate the multi-AP location packets/frames. The client device sends a location request frame to the AP to which it is associated. All other APs in the AoA group that hear the request frame send an AoA frame using their predetermined/designated subcarriers.

To reduce the amount of data transmitted in each packet, the details about an AoA group can also be sent to the client devices beforehand, requiring only an AoA group ID number to be transmitted with the packet. When one of these AoA groups is scheduled to transmit, all APs in that AoA group collapse (switch) to the same channel to make their transmissions. The location packets can be broadcast or unicast. The important part of the location packets is to provide sounding with the training fields. There could be additional data contained in the location packets, but it would be of secondary importance to the AoA location estimation. Alternatively, dedicated monitor radios on the AP are tuned to the common channel to listen for announcements indicating when AoA groups may need to participate in a coordinated/simultaneous location packet transmission session. The use of dedicated monitor radios on the AP would allow the AP to monitor for AoA group participation without disrupting the AP's traffic handling duties, and the monitor radio can switch between channels as needed to determine an AoA group participation responsibilities of the AP. In addition, the radio transmitter that sends the location packet can be different from the transmitter in the AP that is used to handle normal traffic. That is, a first radio transceiver is used for traffic handling, and a second radio is used for monitoring location functions.

AP Synchronization

The degree of synchronization between APs needs to be sufficient so that the client device can receive the location packets at a relatively low data rate, such as binary phase shift key (BPSK) modulation. In other words, the synchronization needs to be within some guard interval duration, e.g., 400 ns. At the most basic level, the client device does not need to decode the received location packet. It only needs to obtain a channel estimate or cross-correlation on the received packet.

There are several possibilities for AP synchronization to coordinate location packet transmissions. Either the AP clocks are time and frequency locked, or only frequency locked. Clock synchronization between APs may be achieved by a number of methods:

Over-the-air synchronization frames with time-of-departure (TOD) and time-of-arrival (TOA) processing as disclosed in U.S. Pat. No. 8,249,049;

Distributed reference oscillator to provide frequency lock;

Distributed reference oscillator with periodic synchronization frames for time/frequency lock;

Synchronization frames time-stamped with TOD/TOA measurements along with knowledge of AP positions provides additional synchronization data;

IEEE 1588 distributed clock synchronization; and

Sub-1 ppm clock alignment in manufacturing calibration, with existing clock pulling programmable capacitor bank in an RF transceiver.

As explained above, the synchronization between APs does not need to be persistent, and it is sufficient that synchronization occur immediately before and during the location packet transmissions.

Advantages of a Single Packet per AP AoA Group

The more APs involved in a location solution the better. However, the more packets that need to be sent by APs, the less capacity the AP has to perform other functions and the less capacity the radio channel has to handle real traffic. Also, if the client is mobile, having separate packets from each AP in the location solution would mean that those packets need to occur at different times, which have the potential to be separated in time far enough so that the client is actually in different positions when it receives each packet from the respective APs, and the final location estimation will be less accurate since each AP estimates it to be in a different set of possible locations.

In addition, client devices are very sensitive to battery life. Minimizing the number of frames and number of channels makes the solution more interesting to implement for different manufacturers of client devices. Thus, the simultaneous transmission of multiple subsets of subcarriers from multiple APs at different known locations as presented herein has several advantages.

Calibration

Calibration is best done at the AP by applying a needed phase rotation to the spatial mapping at each of transmit chain. This phase rotation corrects for phase imbalances in the transmit chains that would be seen at the client device as phase error resulting in AoA estimation error.

Figure 6:
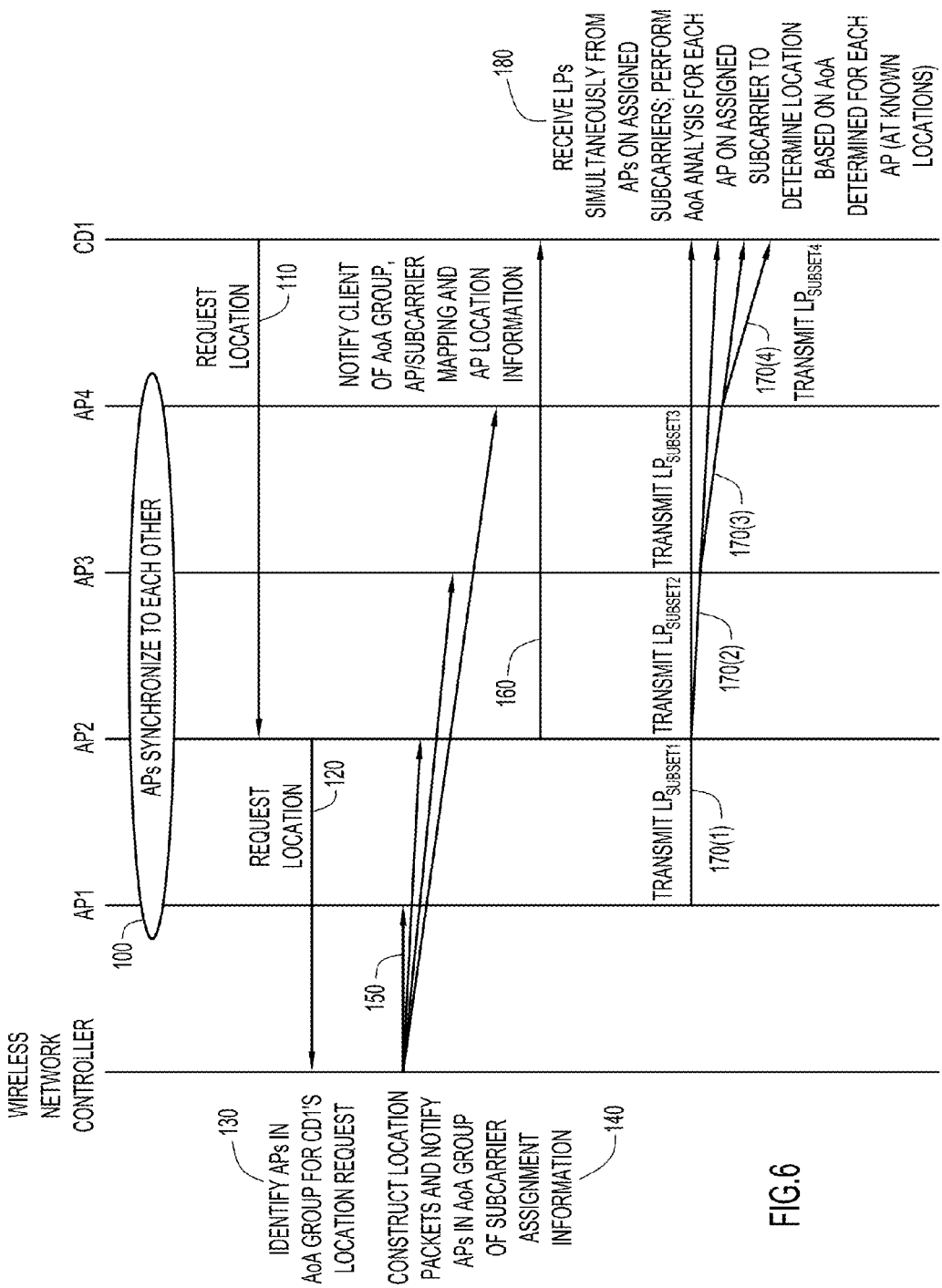
FIG. 6 is a ladder diagram showing an example of signal flow between access points, and between the access points and a client device in accordance with the angle-of-arrival location techniques presented herein.

Reference is now made to FIG. 6 for a description of a signal/message flow in connection with the location scheme presented herein. FIG. 6 is described for the example scenario in which CD1 is associated to AP2. As shown at reference numeral 100, each of the APs AP1, AP2, AP3 and AP 4 are synchronized to each other through any means, examples of which are described above. In the example of FIG. 6, the client device, CD1, initiates the location procedure by sending a location request at 110, but it is to be understood that this is optional. AP2 receives the location request from CD1, and at 120, forwards it to the wireless network controller. At 130, the wireless network controller identifies APs in the AoA group applicable for CD1 to serve the location request from CD1. Then, at 140, the wireless network controller constructs the location packets and notifies the APs in the AoA group of the subcarrier assignment information. At 150, the wireless network controller or some other management entity sends the subcarrier assignment information to the APs in the AoA group, e.g., to AP1, AP2, AP3 and AP4, along with an AoA group identifier that identifies the group of APs to participate in the AoA group transmission.

At 160, AP2, to which CD1 is associated, sends a message to CD1 notifying it of the AoA group to be participating in the location session, an AoA group identifier, the AP/subcarrier assignment information for each AP and the location information for each AP. Alternatively, instead of sending this information in advance of the location packet, each AP may send it as part of its location packet, as described above in connection with FIG. 3. As still another alternative, one of the APs in the AoA group sends an announcement frame to other APs in the AoA group to prompt the APs in that AoA group to transmit location packets simultaneously. The announcement frame contains information indicating the information described above, AP locations and subcarrier mappings/assignments to APs. Then, AP1, AP2, AP3 and AP4 simultaneously transmit their respective location packets (with corresponding subsets of subcarriers) to CD1 as shown at 170(1), 170(2), 170(3) and 170(4), respectively.

At 180, CD1 receives the location packets simultaneously transmitted from the APs on assigned subcarriers, performs AoA analysis for each AP on the assigned subcarriers to determine its location based on the AoA determined for each AP at their respective known locations.

Location Packet Reception and Processing

In order to perform AoA location estimation on the received location packets during an AoA group transmission, a client device needs to have information indicating the locations of the APs participating in the AoA group transmission, the subcarrier mappings (which APs were assigned to transmit on which subcarriers), the antenna configurations of each AP (e.g., linear array, circular array, or more generally the (x,y,z) spatially characteristics of the antenna elements), training field symbols and antenna mapping for the symbols (e.g., an 802.11n or 802.11 ac explicit sounding frame).

A client device receives the AoA group transmission, and, for each subcarrier, has some number of sounded streams (if an explicit sounding type scheme is used). From the received subcarriers of the location packets (in an AoA group transmission, or from the AoA group ID), the client device is able to interpret the spatial stream/subcarrier phase from the channel estimation and translate that to the AoA for each AP. Thus, the client will then have an AoA estimation for each of the APs from which it received a location packet (containing a subset of subcarriers).

Figure 7:
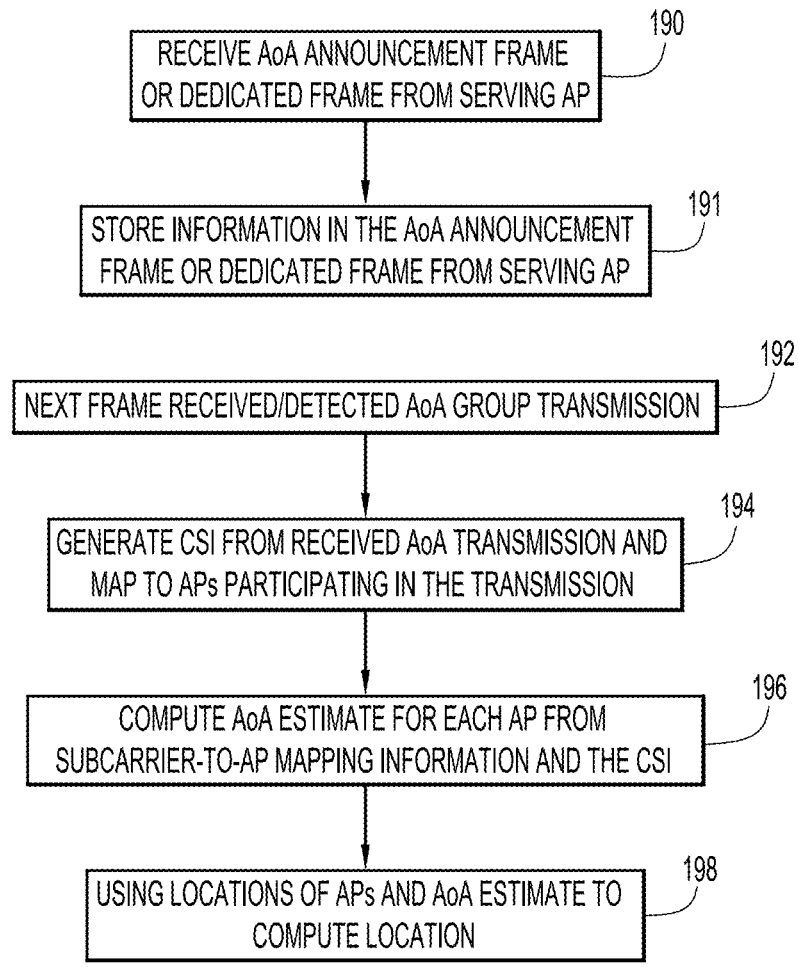
FIG. 7 is a flow chart depicting operations performed at a client device to determine its location using the distributed-input angle-of-arrival location techniques presented herein.

Reference is now made to FIG. 7. FIG. 7 shows a flow chart generally depicting operations performed at a client device for the client device to determine its AoA location estimate. At 190, the client device receives the announcement frame transmitted from an AP to other APs in an AoA group to coordinate the AoA group transmission, as described above in connection with operation 160. Alternatively, the serving AP (i.e., AP to which the client is associated) may transmit a dedicated frame/message to that client, which message contains the location of the APs and the subcarrier mapping among the APs in the AoA for the imminent AoA group transmission. At 191, whether from a received announcement frame or from a dedicated message from the AP to which the client is associated, the client saves/stores information, obtained at 190, indicating the APs involved in the imminent AoA transmission, the locations of those APs and the subcarrier-to-AP assignment/mapping information. At 192, the next transmission/frame the client device receives should be the AoA group frame/transmissions made by the APs in that AoA group. The AoA group frame/transmissions may take any of the forms described above. At 194, the client device computes channel state information (CSI) from the received transmissions from the APs and maps the received CSI on each subcarrier to corresponding APs based on the information obtained at 191. At 196, the client device computes an AoA estimate for each AP from the subcarrier-to-AP mapping information and the CSI computed at 194. At 198, the client device computes a location estimate using the AoA estimates for each AP and the known locations of each AP.

It should be understood that in some applications, it may be desirable for the computations made at 196 and 198 to be performed at a device other than the client device. For example, the client device may send the data obtained at 194 to a computing device (anywhere in the network or cloud), via its serving AP, so that the more complex computations of operations 196 and 198 are performed external to the client device. The location result from these computations may be returned to the client device by a wireless message, via its serving AP, and/or may be used elsewhere for various location-based services on behalf of the client device or for network management purposes.

The following is a description of an example of the techniques described above. References are made below to certain MATLAB functions. There are 5 APs in this example and each has 4 transmit chains and 4 subcarriers allotted to it:

numAp=5;
numTxAp=4;
numSubcarriersPerAp=4.

The mapping of each AP (each row represents an AP) to subcarriers (each column has the numeric index of a subcarrier for that AP) is:

indx=[0*numSubcarriersPerAp+1:1*numSubcarriersPerAp;

1*numSubcarriersPerAp+1:2*numSubcarriersPerAp;
2*numSubcarriersPerAp+1:3*numSubcarriersPerAp;
3*numSubcarriersPerAp+1:4*numSubcarriersPerAp;
4*numSubcarriersPerAp+1:5*numSubcarriersPerAp].

The random phase imbalance that is calibrated out by each AP during transmission of its AoA packet is represented (numAp rows by numTxAp columns) as:

theta_tx=exp(sqrt(−1)*randn(numAp,numTxAp)).

The 802.11n/ac transmit matrix for 1:4 spatial streams is:

P=[[1 1 1−1].'[1 1−1 1].'[1−1 1 1].'[−1 1 1 1].'].

In this "ideal" example, the APs have linear array antennas with ½ wavelength, arranged in a circular pattern around the client device. The array spacing in wavelengths is:

arr=[−¾ −¼ ¼ ¾].

The expected phase given angle-of-arrival is:

expected_phase_for_aoa=exp(sqrt(1)*[pi/2*[sin(linspace(0,359,360)*pi/180).'*repmat([arr],1, 1)]]), where rows are AoA in degrees in 1 degree increments and "repmat" is the MATLAB replicate and tile array function, "linespace" is the MATLAB function that generates linearly spaced vectors and "pi"=π. For example, row 1 represents the expected phase for each spatial stream received at the client if the AoA is from 0 degrees boresight of the AP's linear array.

Five (5) evenly divided phases, among 360 degrees, are selected for the APs:

actual_phase_for_aoa=expected_phase_for_aoa((0: 360/numAp:359)+1,:).

For example, AP1 is at 0 degrees, AP2 is at 72 degrees, AP3 is at 144 degrees, and so on. This also represents an ideal representation of the over-the-air channel for each AP, although it only contains phase rotation and not amplitude.

The following is pseudo-code depicting the construction of the packet in the frequency domain for each of the APs (denoted by index i):

```
for i = 1:numAp
    for k = indx(i,:)
        [Signal transmitted from APi at subcarrier k]
        S = diag(theta_tx(i,:))*conj(diag(theta_tx(i,:)))*P;
        [noise that will be added to ideal channel]
        n = (randn(size(diag(actual_phase_for_aoa(i,:))*S)) + sqrt(-1)*randn(size(diag(actual_phase_for_aoa(i,:))*S)));
        [snr of 20 dB converted to amplitude of noise]
        snr = 10^(20/20);
        [What is received at the client antenna]
        R(:,:,k) = diag(actual_phase_for_aoa(i,:))*S + n/snr;
    end
end
```

The following is an explanation of the reception of the packet and computation of the AoA for each AP. The client retrieves the phases, normalizes each relative to spatial stream 1, computes a weighted average across the subcarriers allotted for each AP, and computes the expected AoA for each AP by correlating across the ideal expected. Example of MATLAB pseudo-code for these operation is:

```
for i = 1:numAp
    for k = 1:numSubcarriersPerAp
        [Remove P matrix from channel per 802.11n/ac standard. Removing
            802.11n/ac per spatial High-Throughput/Very High-Throughput Cyclic Shift Diversity
            would also occur here, but is not included in this example]
        RxAp(:,k) = diag(R(:,:,indx(i,k))*P');
    end
    [Normalize phase to spatial stream 1 and sum up across subcarrier for that AP]
    Rx_normalized_to_ss1 = RxAp(1,:)*RxAp';
    [Do a correlation across all possible expect AoA values
        with a resolution of 1 degree, but could be done with any resolution]
    corr = (abs(Rx_normalized_to_ss1*expected_phase_for_aoa'));
    [Removes the ambiguous case for this example]
    corr([91:269]) = 0;
    [mx index_of_highest_corr] = max(corr);
    [From the AoA with the highest correlation, the client device knows the
    AoA for that AP]
    AoA(i) = -index_of_highest_corr-1;
end
```

The client now has the AoA from each AP and the location of each AP on a map. It can use the AoA information and AP locations to calculate its own location on the map.

Note that in the pseudo-code presented herein, the text between the brackets [..] are explanatory comments for the operations listed below the brackets. Also, in the MATLAB pseudo-code above, "diag", "conj", "randn", and "size" are standard MATLAB functions. The "randn" function generates arrays of random numbers whose elements are normally distributed with mean 0 and variance 1. The "diag" function is the diagonal function. The "conj" function performs a complex conjugate. The "size" function returns the sizes of each dimension of an array. The meaning of other functions contained in the MATLAB code presented herein can be obtained from publicly available information on the MATLAB design suite.

Figure 8:
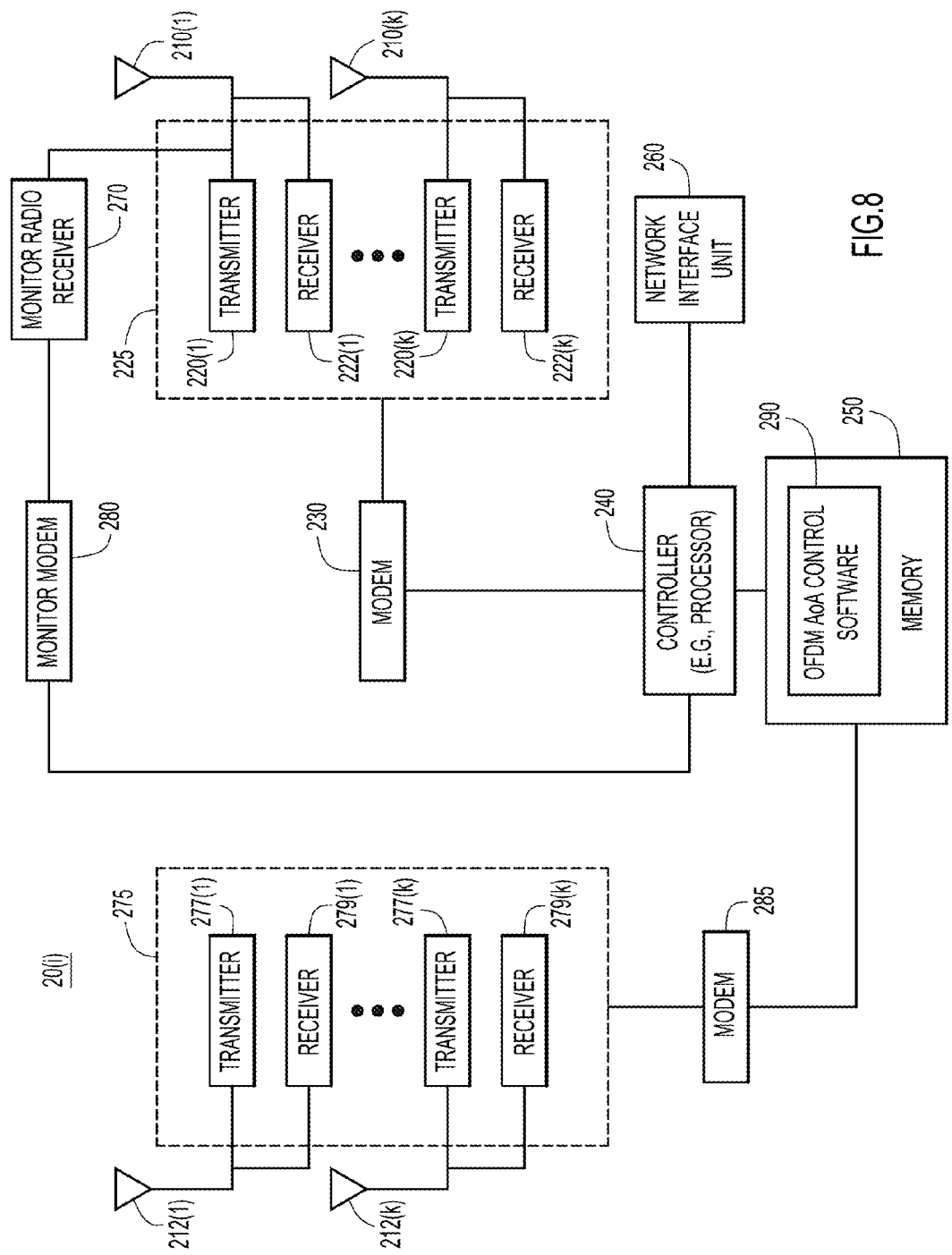
FIG. 8 is an example block diagram of an access point configured to participate in the angle-of-arrival location techniques presented herein.

Referring now to FIG. 8, a block diagram is shown of an AP configured to perform the techniques described herein. The diagram in FIG. 8 is meant to be representative of any of the APs referred to herein. For simplicity, the AP shown in FIG. 8 is generically identified by reference numeral 20(i).

The AP 20(i) comprises a plurality of antennas, 210(1)-210(k), and a corresponding plurality of transmitters 220(1)-220(k) and receivers 222(1)-222(k), each coupled to a corresponding one of the plurality of antennas 210(1)-210(k). The plurality of transmitters 220(1)-220(k) and receivers 222(1)-222(k) may be part of an integrated radio transceiver 225. A baseband processing unit or modem 230 is coupled to the radio transceiver 225, and performs baseband signal processing, such as baseband modulation of transmit signals and baseband demodulation of receive signals.

A control unit (controller) 240 is coupled to the baseband processing unit 230. The control processor 240 performs high level control of the AP. The control processor 240 may comprise a microprocessor or microcontroller that executes software instructions stored in memory 250.

The AP includes a network interface unit 260, e.g., a network interface card, to enable wired network communications on behalf of the AP. The AP may optionally include a monitor radio receiver 270 and a monitor modem 280 that enables the AP to scan channels and monitor for AoA group assignment independently of the AP's wireless traffic handing responsibilities performed by the radio transceiver 225 and modem 230.

The memory 250 stores instructions for OFDM AoA control software 290 that, when executed by the controller 240, cause the controller 240 to perform the operations described herein to allow an AP to participate in the OFDM AoA location procedures described herein.

The baseband processing unit 230 may be implemented by digital logic gates in one or more application specific integrated circuits, or may be implemented by software executed by the control processor 240. In either case, the baseband unit 230 includes logic to select certain subcarriers to be used for a transmission in order to support the transmission of a location packet on a subset of subcarriers (for all or certain transmitter/antenna paths)

The memory 250 may comprise read only memory (ROM), random access memory (RAM), magnetic disk storage media devices, optical storage media devices, flash memory devices, electrical, optical, or other physical/tangible memory storage devices. Thus, in general, the memory 250 may comprise one or more tangible (non-transitory) computer readable storage media (e.g., a memory device) encoded with software comprising computer executable instructions and when the software is executed (by the controller 240) it is operable to perform the operations described herein at an AP.

The controller 240 of the AP will also perform necessary clock synchronization functions in order to ensure that the AP is properly synchronized with other APs in a given AoA group, thereby achieving time alignment (simultaneity) of transmission of a location packet with transmissions by other members of an AoA group.

In one variation, and as mentioned above, the AP may include a third radio transceiver and modem dedicated solely to location operations. Thus, as shown in FIG. 7, there is another plurality of antennas 212(1)-212(k), each connected to an associated transmitter and receiver in radio transceiver 275. That is, there is a transmitter 277(1) and receiver 279(1) connected to antenna 212(1), . . . , and transmitter 277(k) and receiver 279(k) connected to antenna 212(k). The radio transceiver 275 is connected to a dedicated modem 285, which is in turn connected to the controller 240. The radio transceiver 275 and modem 285 serve as a dedicated radio for location functions. The controller 240 would perform the location techniques presented herein through the use of radio transceiver 275 and modem 285, without the need to take away time from traffic handling functions of radio transceiver 225 and modem 230. The monitor radio receiver 270 and modem 280 may also be used to compliment the location operations of radio transceiver 275 and modem 285, by monitoring the various channels in the frequency band that the AP may be called upon to engage in a coordinated location packet transmission event/session with other APs.

Figure 9:
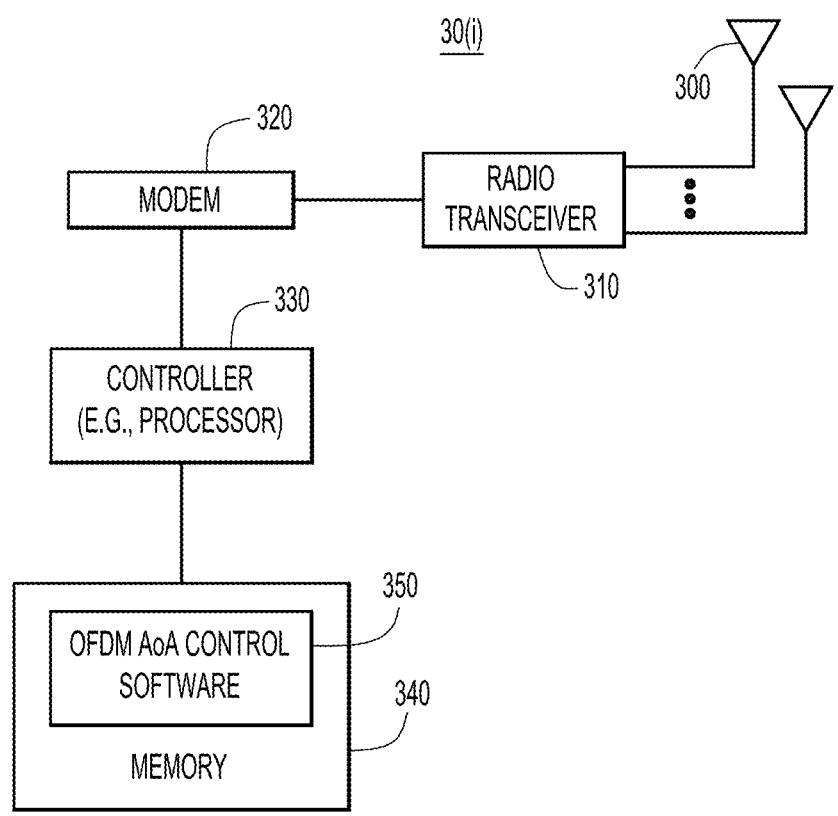
FIG. 9 is an example block diagram of a client device configured to participate in the angle-of-arrival location techniques herein.

Reference is now made to FIG. 9. FIG. 9 shows an example block diagram of a client device, shown generically at reference numeral 30(i), configured to participate in the OFDM AoA location techniques presented herein, and to ultimately determine its location based on signals received from multiple APs. The client device 30(i) includes one or a plurality of antennas, shown at reference numeral 300, a radio transceiver 310, a modem 320, a controller 330 and memory 340. The radio transceiver 310 processes signals received at the antenna(s) 300 and supplies a baseband receive signal(s) to the modem 320. Similarly, the radio transceiver transmits signals via the antenna(s) 300 from baseband transmit signals supplied to it from the modem 320. The modem 320 performs the baseband modulation of transmit signals and demodulation of receive signals. Of relevance to the techniques presented herein, the modem will receive the location packets simultaneously transmitted (on different subcarriers) from the APs in an AoA group. The controller 330 is a microprocessor or microcontroller that executes instructions stored in memory 340, and in particular client AoA software 350, to enable the controller 330 to perform the AoA analysis needed for deriving a location of the client device according to the techniques presented herein.

To summarize, techniques are presented herein in which multiple APs coordinate in simultaneously sending a packet to one or multiple client devices to enable the client device(s) to compute its location. Each AP is allocated specific subcarriers within the overall signal bandwidth. The client is capable of using the subcarriers in the packets simultaneously transmitted (within the duration of a single packet) from the multiple APs to resolve the AoA of transmissions from those multiple APs. Thus, the airtime of only one (a single) packet (collectively across the multiple APs) is needed in order to enable the client device to derive its location, regardless of how many APs are participating in the location session. Prior methods would require one packet separately and sequentially sent per AP over time, such that the amount of airtime needed for the packets is roughly equal to the number of APs multiplied by the duration of the packet.

It should be understood that there may be situations in which the client device does not have the computing capability/capacity to compute its location, but it can offload the raw data associated with its reception of the simultaneously transmitted packets from the APs to another device, e.g., AP, location server, wireless network controller, etc., to enable that device to compute the location of the client data based on the raw data, and send the location information back to the client device or to some other device.

As explained above, while the foregoing description uses the terms "APs" and "clients", it is to be understood that these techniques are not limited to use in IEEE 802.11 wireless local area networks. Thus, the term first wireless device is intended to broadly refer to APs and other wireless access devices that serve wireless devices any type of wireless network (local or wide area). Likewise, the term second wireless device is meant to broadly refer to wireless client devices, mobile stations, user equipment, etc.

To summarize, a method is provided in which a particular first wireless device having a plurality of antennas that is part of a group of a plurality of first wireless devices, transmits to a second wireless device a packet across the plurality of antennas of the particular first wireless device simultaneously with a plurality of packets transmitted by a corresponding one of other first wireless devices in the group, the packet transmitted by the particular first wireless device using a subset of a set of subcarriers otherwise available for use in the packet such that substantially the entire set of subcarriers are used in the aggregate across the plurality of packets simultaneously transmitted by the plurality of first wireless devices in the group to the second wireless device to enable the second wireless device to perform angle of arrival location determination with respect to the plurality of first wireless devices in the group.

Similarly, an apparatus is provided comprising a plurality of antennas; a transmitter unit configured to generate a plurality of individual transmit signals, each for a corresponding one of the antennas; a receiver unit configured to detect signals received at one or more of the plurality of antennas; a modem configured to modulate signals for transmission by the transmitter unit and to demodulate one or more signals obtained by the receiver unit; and a control unit coupled to the modem. The control unit is configured to: generate a packet for transmission by the transmitter unit across the plurality of antennas, the packet being one of a plurality of packets simultaneously transmitted by a corresponding one of a plurality first wireless devices in a group, and the packet using a subset of subcarriers otherwise available for use in the packet such that substantially an entire set of subcarriers are used in the aggregate across the plurality of packets simultaneously transmitted by the plurality of wireless devices in the group to a second wireless device to enable the second wireless device to perform angle of arrival location determination with respect to the plurality of first wireless devices in the group.

Further still, a method is provided receiving from one of a plurality of first wireless devices at a second wireless device a message indicating that the plurality of first wireless devices are prepared to simultaneously transmit a plurality of packets to the second wireless device, each packet being transmitted from a plurality of antennas of respective ones of the first wireless devices, the message containing subcarrier mapping information indicating a subset of a set of subcarriers that each of the plurality of first wireless devices is to use in transmitting the respective packets to the second wireless device; and receiving the plurality of packets simultaneously transmitted by the plurality of first wireless devices; generating channel state information for reception of the plurality of packets at the second wireless device and mapping the channel state information to respective ones of the plurality of first wireless devices; computing an angle-of-arrival estimate for the packet received from each of the respective first wireless devices based on the channel state information and the subcarrier mapping information; computing a location of the second wireless device based on the angle-of-arrival estimates for the plurality of first wireless devices and locations of the plurality of first wireless devices.

Described above are examples. The concepts described herein may be embodied in other specific forms without departing from the spirit or essential characteristics thereof. The foregoing examples are therefore to be considered in all respects illustrative and not meant to be limiting. Accordingly, it is intended to embrace all such alterations, modifications and variations that fall within the spirit and scope of any claims filed in applications claiming priority hereto interpreted in accordance with the breadth to which they are fairly, legally and equitably entitled.

What is claimed is:

1. A method comprising:
at a particular first wireless device having a plurality of antennas and that is part of a group of a plurality of first wireless devices at respective known locations, generating a location packet to be transmitted to a second wireless device, wherein the location packet is one of a plurality of location packets enabling a second wireless device to determine a location of the second wireless device by performing angle of arrival location determination with respect to the respective known locations of the plurality of first wireless devices;
determining a particular subset of subcarriers among a set of subcarriers available for use in transmitting the location packet, the particular subset of subcarriers associated with the particular first wireless device;
transmitting the location packet to the second wireless device across the particular subset of subcarriers using the plurality of antennas of the particular first wireless device, wherein the location packet is transmitted simultaneously with the plurality of location packets transmitted by a corresponding one or more of other first wireless devices in the group,
wherein the plurality of location packets are simultaneously transmitted within a duration of a single location packet by the plurality of first wireless devices in the group to the second wireless device using respective different subsets of subcarriers to enable the second wireless device to perform angle of arrival location determination with respect to the respective known locations of the plurality of first wireless devices in the group.

2. The method of claim 1, wherein transmitting the location packet comprises transmitting the particular subset of subcarriers of the location packet across all or select one or more of the antennas of the particular first wireless device.

3. The method of claim 1, wherein the particular subset of subcarriers are contiguous or staggered.

4. The method of claim 1, further comprising determining which subcarriers to use in the particular subset based on uplink signals received at the particular first wireless device from the second wireless device.

5. The method of claim 4, further comprising receiving at the particular first wireless device a request from the second wireless device to initiate a location procedure, wherein transmitting the location packet from the particular first wireless device and the plurality of location packets from all other first wireless devices in the group is in response to receiving the request.

6. The method of claim 1, further comprising receiving at the particular first wireless device from a management entity information about the location packet to be transmitted by the particular first wireless device, the information indicating the particular subset of subcarriers to be used in the location packet to be transmitted by the particular first wireless device and a group identifier that identifies the group of the plurality of first wireless devices to participate in simultaneously transmitting to the second wireless device.

7. The method of claim 6, further comprising including within the location packet transmitted by the particular first wireless device information indicating the known location of the particular first wireless device, information indicating the particular subset of subcarriers to be used by the particular first wireless device and the group identifier.

8. The method of claim 6, further comprising transmitting to the second wireless device, in advance of the location packet transmitted by the particular first wireless device, a message containing information indicating the group identifier, information indicating the respective known locations of each of the plurality of first wireless devices in the group, and information indicating the respective different subsets of subcarriers to be used by each of the plurality of first wireless devices in the group in simultaneously transmitting the plurality of location packets to the second wireless device.

9. An apparatus comprising:
a plurality of antennas;
a transmitter unit configured to generate a plurality of individual transmit signals, each for a corresponding one of the antennas;
a receiver unit configured to detect signals received at one or more of the plurality of antennas;
a modem configured to modulate signals for transmission by the transmitter unit and to demodulate one or more signals obtained by the receiver unit;
a control unit coupled to the modem, the control unit configured to:
generate a location packet for transmission by the transmitter unit across the plurality of antennas, the location packet being one of a plurality of location packets simultaneously transmitted by a particular first wireless device among a plurality of first wireless devices in a group, each of the plurality of first wireless devices associated with respective known locations, wherein the plurality of location packets enable a second wireless device to determine a location of the second wireless device by performing angle of arrival location determination with respect to the respective known locations of the plurality of first wireless devices;

determine a particular subset of subcarriers among a set of subcarriers available for use in transmitting the location packet and cause the transmitter unit to transmit the location packet to the second wireless device such that the plurality of location packets are simultaneously transmitted within a duration of a single packet by the plurality of first wireless devices in the group to the second wireless device using respective different subsets of subcarriers to enable the second wireless device to perform angle of arrival location determination with respect to the respective known locations of the plurality of first wireless devices in the group.

10. The apparatus of claim 9, wherein the control unit is configured to generate the location packet so as to transmit the particular subset of subcarriers across all or select one or more of the plurality of antennas.

11. The apparatus of claim 9, wherein the control unit is configured to determine the particular subset of subcarriers for use in transmitting the location packet based on information contained in a frame received from another of the plurality of first wireless devices, the information contained in the frame indicating the particular subset of subcarriers to be used in the location packet to be transmitted by the particular first wireless device and a group identifier that identifies the group of the plurality of first wireless devices to participate in simultaneously transmitting to the second wireless device.

12. The apparatus of claim 9, wherein the control unit is configured to determine which subcarriers to use in the particular subset of subcarriers based on uplink signals received from the second wireless device.

13. The apparatus of claim 9, wherein the control unit is configured to generate for transmission, in advance of the location packet, a message containing information indicating a group identifier for the group of the plurality of first wireless devices, information indicating the known locations of each of the plurality of first wireless devices in the group, and information indicating the respective different subcarriers to be used by each of the plurality of first wireless devices in the group in simultaneously transmitting the plurality of location packets to the second wireless device.

14. The apparatus of claim 9, wherein the control unit is configured to generate for transmission, prior to the simultaneous transmissions of the plurality of location packets, a frame to be transmitted to enable the plurality of first wireless devices to become synchronized.

15. A method comprising:
receiving from one of a plurality of first wireless devices at a second wireless device a message indicating that the plurality of first wireless devices at respective known locations are prepared to simultaneously transmit a plurality of location packets to the second wireless device, each location packet being transmitted from a plurality of antennas of respective ones of the first wireless devices, the message containing subcarrier mapping information indicating a respective subset of a set of subcarriers that each of the plurality of first wireless devices is to use in transmitting the respective location packets to the second wireless device; and receiving the plurality of location packets simultaneously transmitted by the plurality of first wireless devices;

generating channel state information for reception of the plurality of location packets at the second wireless device and mapping the channel state information to respective ones of the plurality of first wireless devices;

computing an angle-of-arrival estimate for each location packet received from each of the respective first wireless devices based on the channel state information and the subcarrier mapping information; and computing a location of the second wireless device based on the angle-of-arrival estimates for the plurality of first wireless devices and the respective known locations of the plurality of first wireless devices.

16. The method of claim 15, wherein the message comprises an announcement message containing information identifying the plurality of first wireless devices that are to simultaneously transmit the plurality of location packets to the second wireless device.

17. The method of claim 16, further comprising storing information contained in the message for use in computing the angle-of-arrival estimates for the plurality of first wireless devices.

18. The method of claim 15, wherein the message further includes information indicating the respective known locations of each of the plurality of first wireless devices.

19. The method of claim 15, wherein each respective subset of subcarriers used by each of the first wireless devices is unique.

20. The method of claim 15, wherein the plurality of first wireless devices are wireless access point devices operating in a wireless local area network, and the second wireless device is a client device operating in the wireless local area network.

* * * * *